(12) United States Patent
Tang et al.

(10) Patent No.: US 11,249,809 B1
(45) Date of Patent: Feb. 15, 2022

(54) LIMITING CONTAINER CPU USAGE BASED ON NETWORK TRAFFIC

(71) Applicant: International Business Machines Corporation, Armonk, NY (US)

(72) Inventors: Gang Tang, Nanjing (CN); He Jing, WuXi (CN); XingYu Zhu, WuXi (CN); Mo Zhou, Wuxi (CN); Ming Shuang Xian, NanChang District (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/168,240

(22) Filed: Feb. 5, 2021

(51) Int. Cl.
*H04L 12/26* (2006.01)
*G06F 9/50* (2006.01)
*H04L 12/24* (2006.01)

(52) U.S. Cl.
CPC ........ *G06F 9/5044* (2013.01); *H04L 41/0896* (2013.01); *H04L 43/08* (2013.01); *H04L 43/16* (2013.01)

(58) Field of Classification Search
CPC ... G06F 9/5044; H04L 41/0896; H04L 43/08; H04L 43/16
See application file for complete search history.

(56) References Cited

U.S. PATENT DOCUMENTS

| | | | | |
|---|---|---|---|---|
| 8,738,972 | B1* | 5/2014 | Bakman | G06F 11/3442 714/47.2 |
| 9,639,502 | B1* | 5/2017 | Kumar | H04L 41/0896 |
| 10,289,441 | B1* | 5/2019 | Chopra | G06F 9/45558 |
| 2012/0278459 | A1* | 11/2012 | VerSteeg | H04L 69/163 709/223 |
| 2015/0277959 | A1* | 10/2015 | Higuchi | G06F 9/45558 718/1 |
| 2017/0199770 | A1 | 7/2017 | Peteva | |
| 2018/0109464 | A1 | 4/2018 | Chen | |
| 2018/0285166 | A1* | 10/2018 | Roy | G06F 11/34 |
| 2019/0095236 | A1 | 3/2019 | Felter | |
| 2020/0133702 | A1* | 4/2020 | Sharma | G06F 9/5088 |

FOREIGN PATENT DOCUMENTS

CN 106878042 A 6/2017

OTHER PUBLICATIONS

Turner et al., "CPU Bandwidth Control for CFS", Proceedings of the Linux Symposium, Linux Symposium, Jul. 13-17, 2009, pp. 1-13. <https://research.google/pubs/pub36669/>.

* cited by examiner

*Primary Examiner* — Viet D Vu
(74) *Attorney, Agent, or Firm* — Alexander G. Tochym

(57) ABSTRACT

In an approach to limiting container CPU usage based on network traffic, a packet CPU usage for each packet type of one or more packet types is determined. A network CPU usage is calculated for a specific container based on the network CPU usage for each packet type. A container process CPU usage and a total container CPU usage are calculated for the specific container, where the total container CPU usage is the sum of the network CPU usage and the container process CPU usage. Responsive to determining that the total container CPU usage exceeds a threshold, the container CPU consumption quota and the container network bandwidth setting for the specific container are adjusted to reduce the total container CPU usage, using a set of pre-configured parameters.

20 Claims, 7 Drawing Sheets

| PID | USER | PR | NI | VIRT | RES | SHR | S | %CPU | %MEM | TIME+ | COMMAND |
|---|---|---|---|---|---|---|---|---|---|---|---|
| 28520 | root | 20 | 0 | 4236 | 2088 | 1532 | R | 50.3 | 0.0 | 7:01.87 | bash |

FIG. 2a

| PID | USER | PR | NI | VIRT | RES | SHR | S | %CPU | %MEM | TIME+ | COMMAND |
|---|---|---|---|---|---|---|---|---|---|---|---|
| 28520 | root | 20 | 0 | 4236 | 2088 | 1532 | R | 48.0 | 0.0 | 8:29.30 | bash |
| 17702 | root | 20 | 0 | 19000 | 16332 | 2780 | R | 43.0 | 0.1 | 1:09.46 | iperf3 |

FIG. 2b

| PID | USER | PR | NI | VIRT | RES | SHR | S | %CPU | %MEM | TIME+ | COMMAND |
|---|---|---|---|---|---|---|---|---|---|---|---|
| 7 | root | 20 | 0 | 0 | 0 | 0 | R | 50.2 | 0.0 | 26:01.00 | ksoftirqd/0 |
| 28520 | root | 20 | 0 | 4236 | 2088 | 1532 | R | 38.5 | 0.0 | 8:36.12 | bash |
| 17702 | root | 20 | 0 | 19000 | 16332 | 2780 | R | 11.0 | 0.1 | 1:11.63 | iperf3 |

FIG. 2c

| PID | PPID | USER | STAT | VSZ | %VSZ | CPU | %CPU | COMMAND |
|---|---|---|---|---|---|---|---|---|
| 11 | 1 | ipsec | S | 11576 | 0% | 3 | 0% | /usr/lib/strongswan/charon --debug-ike 2 --debug-cfg 2 |
| 48 | 0 | root | S | 1648 | 0% | 7 | 0% | sh |
| 53 | 48 | root | R | 1584 | 0% | 1 | 0% | top |
| 1 | 0 | root | S | 1336 | 0% | 5 | 0% | /usr/lib/strongswan/starter --daemon charon --nofork |

FIG. 3a

| PID | USER | PR | NI | VIRT | RES | SHR | S | %CPU | %MEM | TIME+ | COMMAND |
|---|---|---|---|---|---|---|---|---|---|---|---|
| 7 | root | 20 | 0 | 0 | 0 | 0 | R | 85.0 | 0.0 | 15:50.17 | ksoftirqd/0 |
| 8 | root | 20 | 0 | 0 | 0 | 0 | S | 5.6 | 0.0 | 0:47.15 | rcu_sched |
| 768 | root | 20 | 0 | 11400 | 5980 | 1260 | S | 0.7 | 0.1 | 0:00.79 | xe-daemon |

FIG. 3b

| PACKET TYPE | PACKET WEIGHT |
|---|---|
| o | $W_o$ |
| p | $W_p$ |
| q | $W_q$ |

FIG. 4a

| PACKET TYPE | PACKET COUNT |
|---|---|
| o | $C_o$ |
| p | $C_p$ |
| q | $C_q$ |

FIG. 4b

| PACKET TYPE | PACKET COUNT |
|---|---|
| o | $AC_o$ |
| p | $AC_p$ |
| q | $AC_q$ |

FIG. 4c

United States Patent US 11,249,809 B1

LIMITING CONTAINER CPU USAGE BASED ON NETWORK TRAFFIC

BACKGROUND

The present invention relates generally to the field of computer resource allocation, and more particularly to limiting container CPU usage based on network traffic.

A container is a standard unit of software that packages up code and all its dependencies so the application runs quickly and reliably from one computing environment to another. A container image is a lightweight, standalone, executable package of software that includes everything needed to run an application: code, runtime, system tools, system libraries and settings. A container consists of an entire runtime environment: an application, plus all of its dependencies, libraries, and other binaries, and configuration files it needs to run, bundled into one package. By containerizing the application platform and its dependencies, differences in operating system distributions and underlying infrastructure are abstracted away.

Control groups (cgroups) are a feature of an operating system kernel by which groups of processes can be monitored and have their resources limited. For example, if you do not want a process to exceed 30% total CPU usage, cgroups allow you to set that limit. Cgroups are an extremely powerful tool by which a user can guarantee limits on performance. Nearly all container orchestrators rely on the kernel cgroup mechanisms to manage resource constraints, including CPU usage.

The bandwidth allowed for a cgroup is specified using a quota and period. Within each given "period", e.g., microseconds, a task group is allocated up to "quota" microseconds of CPU time. That quota is assigned to per-CPU run queues in slices as threads in the cgroup become runnable. Once all quota has been assigned any additional requests for quota will result in those threads being throttled. Throttled threads will not be able to run again until the next period when the quota is replenished.

SUMMARY

Embodiments of the present invention disclose a method, a computer program product, and a system for limiting container CPU usage based on network traffic. In one embodiment, a packet CPU usage for each packet type of one or more packet types is determined. A network CPU usage is calculated for a specific container based on the network CPU usage for each packet type. A container process CPU usage and a total container CPU usage are calculated for the specific container, where the total container CPU usage is the sum of the network CPU usage and the container process CPU usage. Responsive to determining that the total container CPU usage exceeds a threshold, the container CPU consumption quota and the container network bandwidth setting for the specific container are adjusted to reduce the total container CPU usage, using a set of pre-configured parameters.

BRIEF DESCRIPTION OF THE DRAWINGS

FIG. 2a is an example of CPU utilization for a single container, in accordance with an embodiment of the present invention.

FIG. 2b is an example of CPU utilization for two containers, in accordance with an embodiment of the present invention.

FIG. 2c is an example of CPU utilization for the two containers of FIG. 2b, but under a large volume of network traffic, in accordance with an embodiment of the present invention.

FIG. 3a is an example of valid CPU utilization, in accordance with an embodiment of the present invention.

FIG. 3b is an example of CPU utilization that exceeds predetermined thresholds, in accordance with an embodiment of the present invention.

FIG. 4a is an example of assigning weight to various packet types, in accordance with an embodiment of the present invention.

FIG. 4b is an example of packet counts for the various packet types of FIG. 4a, in accordance with an embodiment of the present invention.

FIG. 4c is an example of packet counts for the various packet types of FIG. 4a for a specific container, in accordance with an embodiment of the present invention.

DETAILED DESCRIPTION

In current implementations, CPU resource limitation is based on cgroups. One problem with the cgroup mechanism is that it can only restrict the container process CPU usage. But if the container is a network application, it receives and sends a large amount of packet data through its interface. These packets will be handled through a software interrupt service routine process (softirq), e.g., ksoftirqd, on a hypervisor CPU and this interrupt service process consumes many hypervisor CPU cycles. In addition, the softirq CPU usage cannot be counted into the specified container and cgroups. This means that the CPU resource limitation based on the cgroups will not include the network access CPU usage, and therefore the CPU usage may not meet the desired limitations.

The present invention is a new approach to limit the container CPU usage by the following key steps. The first step is to determine the CPU consumption caused by network traffic for a container that cannot be captured in the container process group. Next, the cgroup CPU limit for the container process group and the network rate limit policy for the container are dynamically adjusted. In this way, the present invention achieves process group CPU usage plus network CPU usage that is less than or equal to the container CPU usage limit. With the present invention, the container CPU usage is limited fairly, and therefore avoids CPU and network abuse in a container environment.

The present invention first accounts for CPU consumption. Hard interrupts can be expensive in terms of CPU usage. Therefore, the hard interrupt handler leaves the majority of packet reception to a software interrupt, or softirq. Most of network packet processing is performed by the network softirq. When the network traffic for a container is high, the softirq consumes a large amount of CPU time. To calculate the network CPU usage of the softirq, the invention places timestamps at the entry and exit of the softirq to time the softirq process. This allows the invention to measure the time for a specific softirq.

Figure 5:
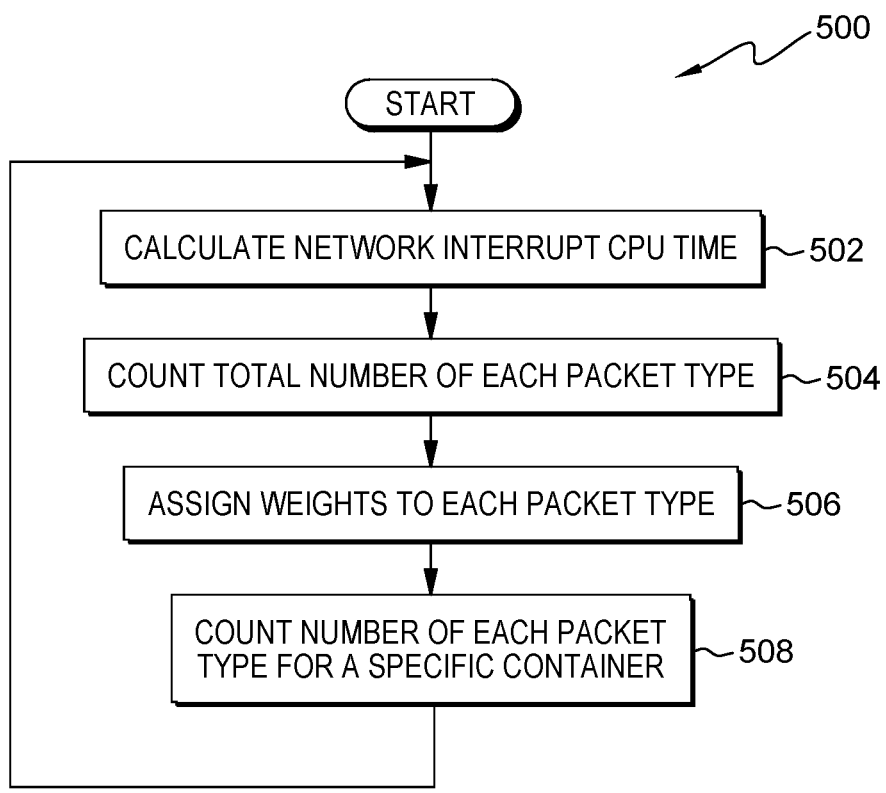
FIG. 5 is a flowchart depicting operational steps of the section of the CPU limiting program that counts the packets for each container, on a computing device within the distributed data processing environment of FIG. 1, for limiting container CPU usage based on network traffic, in accordance with an embodiment of the present invention.

The next step is to count each type of packet that the system, i.e., all running containers combined, may send or receive, as shown in FIG. 4b. Based on the measured time for the softirq, a weight factor is assigned to each packet type, as shown in FIG. 4a. Next, the number of each type of packet that the specific container sends or receives is counted, as shown in FIG. 4c. Finally, the network CPU time for the specific container is calculated. This is explained in detail in FIGS. 4a-4c below, and the procedure is shown in FIG. 5 below.

Next, the CPU limit and network rate limit, or bandwidth limitation, are determined using formula (1).

$$Td = Tu + Tn \quad (1)$$

The CPU usage of the container process, i.e., the actual function of the container, is designated Tu, the CPU usage for the network functions for the container is designated Tn, and the total CPU usage for the container is designated Td. The number Tu is controlled by the cgroup and Tn, which is impacted by the number of packets received/transmitted on the container interface. Td is measured within a configurable interval, and when Td exceeds the initial configuration CPU usage quota (Ti) in the interval, the current cgroup CPU quota configuration and network rate-limiting for the container are adjusted to meet Ti.

The cgroup CPU limitation and network rate-limiting of the container are adjusted gradually to tend to the initial configured CPU limitation (Ti) in a few periods, instead of directly adjusting into place according to the sampling results. To avoid frequent updating of the cgroup CPU limitation and network rate-limiting for the container, a threshold percentage is used to limit the size of the change in the limitation values. To avoid the network accesses (Tn) taking too much CPU quota from the container process (Tu), a maximum network access proportion percentage of the total initial quota (Ti) is used to adjust the CPU usage limitation ratio between Tn and Tu. When the sum CPU usage is in the range of the threshold, the CPU limitation and network rate-limiting for the container are not changed. This is further explained in FIG. 6 below.

Figure 1:
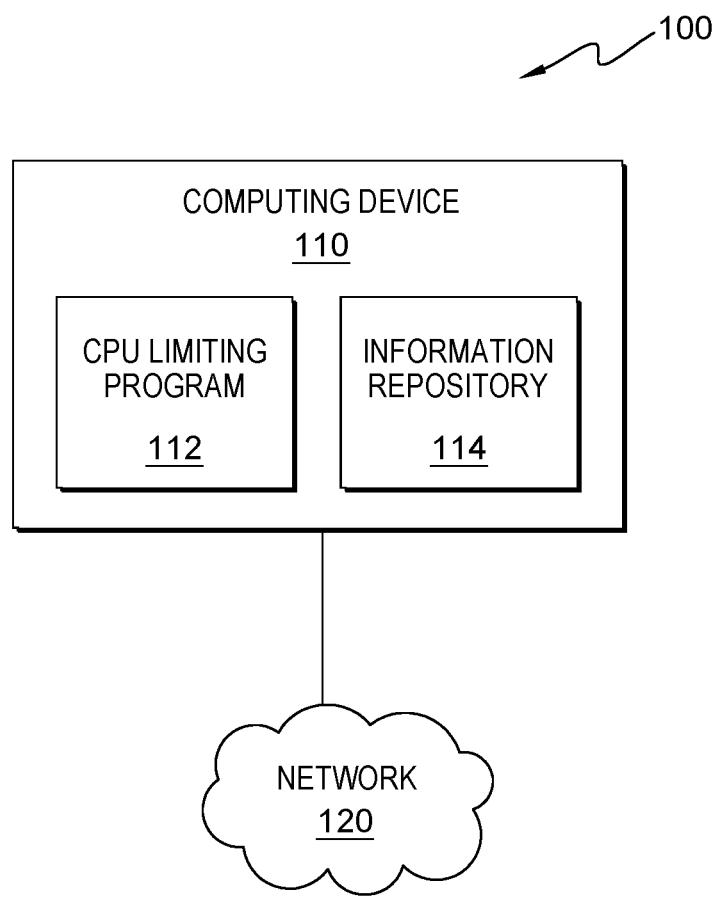
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of CPU limiting program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes CPU limiting program 112. In an embodiment, CPU limiting program 112 is a program, application, or subprogram of a larger program for limiting container CPU usage based on network traffic. In an alternative embodiment, CPU limiting program 112 may be located on any other device accessible by computing device 110 via network 120.

In an embodiment, computing device 110 includes information repository 114. In an embodiment, information repository 114 may be managed by CPU limiting program 112. In an alternate embodiment, information repository 114 may be managed by the operating system of the device, alone, or together with, CPU limiting program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, container configuration data, container data, CPU rate limiting data, network packet data, network bandwidth data, operating system data, configuration data, and other data that is received by CPU limiting program 112 from one or more sources, and data that is created by CPU limiting program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, a NoSQL database, an object-oriented database, or one or more tables.

FIGS. 2a, 2b, and 2c are an example case of the problem statement for the present invention. In the example of FIG. 2a, container1 202 (Process Identification (PID)=28520) was created with the number of CPUs=0.5, which means it is allowed to use 50% capacity of one CPU. In FIG. 2b, container2 204 (PID=17702) has been created with the number of CPUs=0.5, which means container1 202 and container2 204 can use approximately 100% capacity of one CPU. But in this example, FIG. 2c shows that container2 204 (PID=17702) incurs a large volume of network traffic, and Operating System (OS) software interrupt service routine 206 (PID 7) consumes a high number of CPU cycles to service the network interrupts. Therefore, container2 204 effectively consumes 0.61 CPU (the 11% for container2 204 plus the 50.2% for OS software interrupt service routine 206), 20% more than the 0.5 limit. Since current art only restricts CPU usage based on the usage of the container itself, it cannot prevent the container from using more than its allocated bandwidth when the network usage requires additional CPU cycles.

FIGS. 3a and 3b are another example case of the problem statement for the present invention. In the example of FIG. 2a, a Virtual Private Network (VPN) Network Function Virtualization (NFV) container is created with the number of CPUs=0.5. In this example, the container thread only executes the Internet Key Exchange (IKE) negotiation and maintains the Internet Protocol Security (IPSec) connection, so the CPU usage is very small, and displays as 0% in FIG. 3a.

In FIG. 3b, however, when the container encrypts or decrypts IPSec VPN packets, CPU usage for software interrupt service routine 302 (ksoftirqd in this example) encryption/decryption is 85.0%. Therefore, the container that was allocated 0.5 CPU is actually consuming 85% of a CPU, which is more than the 0.5 limit. Since current art only restricts CPU usage based on the usage of the container itself, it cannot prevent the container from using more than its allocated bandwidth when the encryption/decryption usage requires additional CPU cycles.

FIGS. 4a through 4c illustrate an example of accounting for the CPU consumption for a container, in accordance with an embodiment of the present invention. In the example of FIGS. 4a-4c, three packets types are shown; type "o", type "p", and type "q". In actual use, there may be many packet types; only three are shown in this example for clarity. As explained above, a packet weight is assigned to each packet type based on the time previously calculated from the time measured for the softirq for each packet type. In FIG. 4a, weight Wo has been assigned to packet type 'o', weight Wp has been assigned to packet type 'p', and weight Wq has been assigned to packet type 'q'.

In FIG. 4b, CPU limiting program 112 counts the total number of packets processed by the softirq (ksoftiraq in this example) over a time interval 'T' for each packet type, shown as Co, Cp, and Cq. In various embodiments, the time interval 'T' is a system default time interval. In other embodiments, the time interval 'T' is user selectable.

In FIG. 4c, CPU limiting program 112 determines the total number of packets associated with a specific container, container 'A' in this example, that are processed by the softirq over the time interval 'T' for each packet type, shown as ACo, ACp, and ACq. The total network CPU time for container A, Tn, is then calculated using formula (2).

$$Tn=(ACo*Wo+ACp*Wp+ACq*Wq)/(Co*Wo+Cp*Wp+Cq*Wq)*T \qquad (2)$$

This procedure is further explained in FIG. 5 below. Formula (2) is used in FIG. 5 to calculate the network CPU time for a specific container, and the result is used in FIG. 6 to adjust the CPU limitation and network rate-limiting for the container.

FIG. 5 is a flow chart diagram of workflow 500 depicting operational steps of the section of CPU limiting program 112 that counts the packets for each container, on a computing device within the distributed data processing environment of FIG. 1, for limiting container CPU usage based on network traffic, in accordance with an embodiment of the present invention In an alternative embodiment, the steps of workflow 500 may be performed by any other program while working with CPU limiting program 112. In an embodiment, CPU limiting program 112 calculates the software interrupt service routine, e.g., softirq or ksoftirqd, CPU time to establish the network CPU time. In an embodiment, CPU limiting program 112 assigns weights to each type of packet received, e.g., the weights shown in FIG. 4a. In an embodiment, CPU limiting program 112 counts the total number of each type of packet that is handled by the hypervisor over a set period of time, e.g., the packet counts in FIG. 4b. In an embodiment, CPU limiting program 112 counts the number of each type of packet for a specific container over a set period of time, e.g., the container packet counts in FIG. 4c.

It should be appreciated that embodiments of the present invention provide at least for limiting container CPU usage based on network traffic. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

CPU limiting program 112 calculates the network interrupt CPU time (step 502). In an embodiment, CPU limiting program 112 calculates the software interrupt service routine, e.g., softirq or ksoftirqd, CPU time to establish the network CPU time. In an embodiment, when the software interrupt service routine is scheduled to execute on a CPU, the virtual time for the software interrupt service routine is increased. In an embodiment, when the software interrupt service routine is scheduled to stop execution on the CPU, the virtual time for the software interrupt service routine remains unchanged. In an embodiment, CPU limiting program 112 sets a virtual time for the software interrupt service routine based on the virtual start time and the virtual stop time by subtracting the time that the CPU entered the routine from the time that the CPU exited the routine. In an embodiment, CPU limiting program 112 then uses this time difference to calculate the CPU time for the software interrupt service routine per unit time. In an embodiment, the unit time is a time period for calculating the CPU time for software interrupt service. In an embodiment, the unit time is configurable by a user or a system administrator.

CPU limiting program 112 counts the total number of each packet type (step 504). In an embodiment, CPU limiting program 112 counts the total number of each type of packet that is handled by the hypervisor over a set period of time T, e.g., the packet counts in FIG. 4b. In an embodiment, this is the total count of each packet type for all containers running on the system. In an embodiment, the interval for counting the number of packets is a preset threshold. In another embodiment, the interval for counting the number of packets is received from a user or network administrator.

CPU limiting program 112 assigns weights to each packet type (step 506). In an embodiment, CPU limiting program 112 assigns weights to each type of packet received, e.g., the weights shown in FIG. 4a. In an embodiment, the weights assigned to each type of packet is a preset threshold. In another embodiment, the weights to each type of packet are received from a user or network administrator.

CPU limiting program 112 counts the number of each packet type for a specific container (step 508). In an embodiment, CPU limiting program 112 counts the number of each type of packet for a specific container over a set time interval T, e.g., the container packet counts in FIG. 4c. In an embodiment, the period for counting the number of packets is a preset threshold. In another embodiment, the period for counting the number of packets is received from a user or network administrator. In an embodiment, CPU limiting program 112 then returns to step 502 to continue counting container packets.

Figure 6:
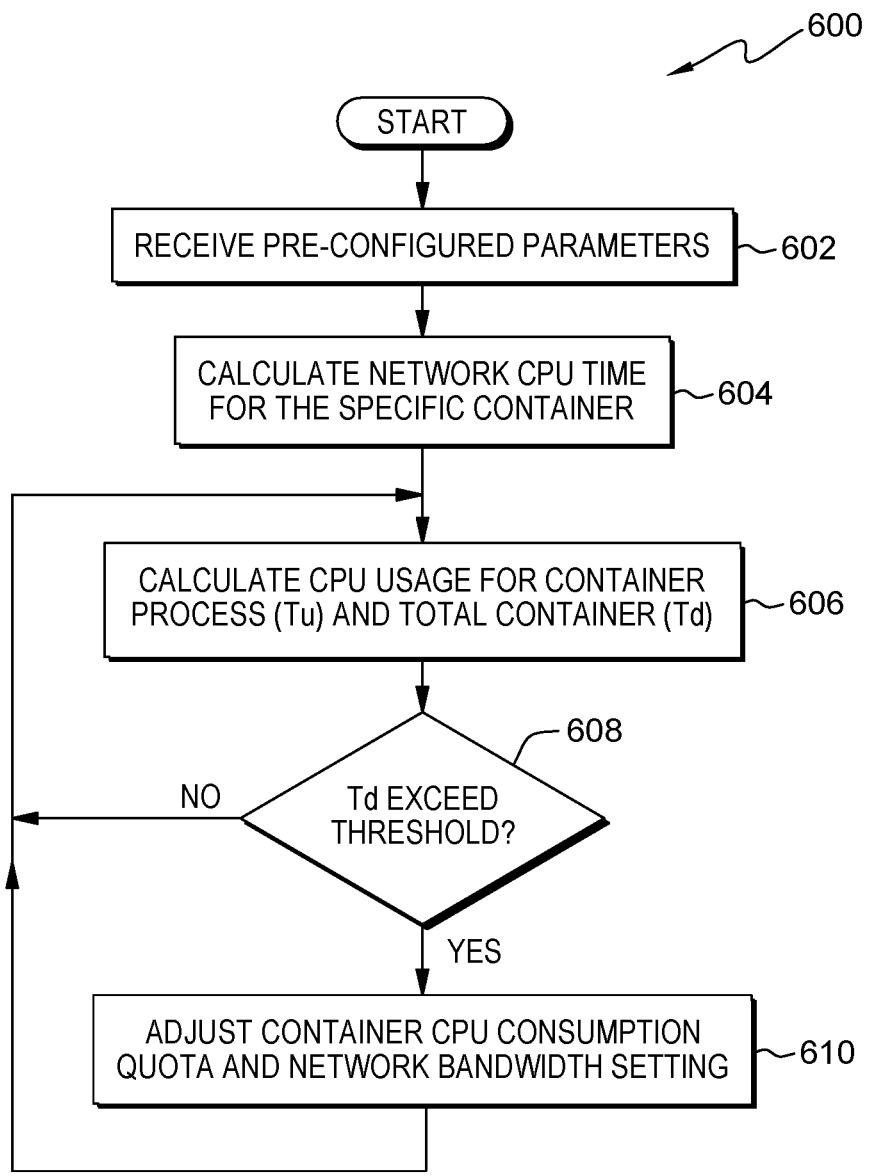
FIG. 6 is a flowchart depicting operational steps of the section of the CPU limiting program that calculates the network CPU usage and adjusts the allocated bandwidth for each container, on a computing device within the distributed data processing environment of FIG. 1, for limiting container CPU usage based on network traffic, in accordance with an embodiment of the present invention.

FIG. 6 is a flowchart depicting operational steps of the section of the CPU limiting program that calculates the network CPU usage and adjusts the allocated bandwidth for each container, on a computing device within the distributed data processing environment of FIG. 1, for limiting container CPU usage based on network traffic, in accordance with an embodiment of the present invention. In an alternative embodiment, the steps of workflow 600 may be performed by any other program while working with CPU limiting program 112. In an embodiment, CPU limiting program 112 receives a set of four pre-configured parameters, an adjustment percentage (A %), a threshold percentage (B %), a maximum proportion of Tn in Ti (C %), and a period time for sampling. In an embodiment, CPU limiting program 112 calculates the network CPU time for the specific container using formula (2) above. In an embodiment, CPU limiting program 112 calculates the total CPU usage for the overall container process (Td) from the sum of the CPU usage of the docker process (Tu) and the container network CPU time (Tn). In an embodiment, CPU limiting program 112 determines if the total CPU usage for the overall container process (Td) exceeds a predetermined threshold. In an embodiment, if CPU limiting program 112 determines that the total CPU usage for the overall container process (Td) exceeds the predetermined threshold, then CPU limiting program 112 adjusts the CPU consumption quota and network bandwidth settings for the specific container.

It should be appreciated that embodiments of the present invention provide at least for limiting container CPU usage based on network traffic. However, FIG. 6 provides only an illustration of one implementation and does not imply any limitations with regard to the environments in which different embodiments may be implemented. Many modifications to the depicted environment may be made by those skilled in the art without departing from the scope of the invention as recited by the claims.

CPU limiting program 112 receives pre-configured parameters (step 602). In an embodiment, CPU limiting program 112 CPU limiting program 112 receives a set of four pre-configured parameters, an adjustment percentage (A %), a threshold percentage (B %), a maximum proportion of Tn in Ti (C %), and a period time for sampling.

In an embodiment, the adjustment percentage (A %) is used to adjust the cgroup CPU quota and network rate-limiting of the container to gradually tend to the initial configured CPU quota (Ti). In a sample period, the CPU quota and network rate-limiting are only adjusted once to avoid excessive impact on the container. In this way, the adjustment is performed gradually and will eventually reach the predetermined threshold.

In an embodiment, the threshold percentage (B %) is used to avoid the frequent updating of the cgroup CPU quota and network rate-limiting for the container. When the CPU usage is within this percentage of the threshold, the bandwidth configuration of the container will not be changed.

In an embodiment, the maximum proportion of Tn in Ti (C %) is used to avoid the total network CPU time for container A, or Tn, taking too much CPU quota from the actual function of the container, Tu. In an embodiment, this is performed by adding a maximum Tn proportion percentage of Ti, which is used to adjust the CPU usage ratio between Tn and Tu.

CPU limiting program 112 calculates the network CPU time for the specific container (step 604). In an embodiment, CPU limiting program 112 calculates the network CPU time for the specific container using formula (2) above. In an embodiment, CPU limiting program 112 calculates the network CPU time using the packet weights determined in FIG. 5 above and applies those packet weights to formula (2). In an embodiment, CPU limiting program 112 uses the count of the number of each type of packet for a specific container over a set time interval from step 508 in FIG. 5 above. In an embodiment, CPU limiting program 112 divides the total network CPU usage time for all packets in the container by the total network CPU usage time for all packets and multiplies this number by the time interval T to determine the network CPU time for the specific container.

CPU limiting program 112 calculates the CPU usage for the container process (Tu) and for the total containers (Td) (step 606). In an embodiment, CPU limiting program 112 calculates the total CPU usage for the overall container process (Td) from the sum of the CPU usage of the docker process (Tu) and the container network CPU time (Tn) calculated in step 604. In an embodiment, CPU limiting program 112 uses formula (1) above for this calculation.

CPU limiting program 112 determines if Td exceeds a threshold (decision block 608). In an embodiment, CPU limiting program 112 determines if the total CPU usage for the overall container process (Td) exceeds a predetermined threshold. In an embodiment, CPU limiting program 112 determines that Td exceeds the predetermined threshold if the current actual CPU bandwidth is equal to the current CPU bandwidth setting, or if Tu is equal to the current CPU quota. In an embodiment, either of these two conditions will trigger a check to determine if the actual bandwidth (for Tn) and CPU cgroup quota (for Td) can be raised. In an embodiment, CPU limiting program 112 may also determine that Td exceeds the predetermined threshold if Td>(1+B %)*Ti or if Td<(1−B %)*Ti.

In an embodiment, if CPU limiting program 112 determines that the total CPU usage for the overall container process (Td) exceeds the predetermined threshold ("yes" branch, decision block 608), then CPU limiting program 112 proceeds to step 610 to adjust the quota and bandwidth settings. In an embodiment, if CPU limiting program 112 determines that the total CPU usage for the overall container process (Td) does not exceed the predetermined threshold ("no" branch, decision block 608), then CPU limiting program 112 returns to step 606 to continue monitoring the CPU usage.

CPU limiting program 112 adjusts the container CPU consumption quota and the network bandwidth setting (step 610). In an embodiment, if CPU limiting program 112 determines that the total CPU usage for the overall container process (Td) exceeds the predetermined threshold, then CPU limiting program 112 adjusts the CPU consumption quota and network bandwidth settings for the specific container.

In an embodiment, the number Tu is controlled by cgroup, and Tn is impacted by the number of packets received/transmitted on the container interface. In an embodiment, CPU limiting program 112 measures Td within a configurable interval. In an embodiment, the configurable interval for measuring Td is a preset threshold. In another embodiment, the configurable interval for measuring Td is received from a user or network administrator. In an embodiment, when Td exceeds the Ti in the interval, CPU limiting program 112 will adjust the current cgroup CPU quota configuration for the container and its network rate-limiting to ensure it meets Ti.

In an embodiment, CPU limiting program 112 adjusts the CPU consumption quota and network bandwidth setting for the container as follows. If Tn>Ti*C %, then the network bandwidth is too high, causing the network functions to consume too much of the CPU quota. In this case, CPU limiting program 112 calculates the excess amount of network bandwidth using formula (3).

$$\text{over\_committed\_BW(bandwidth)} = (Tn - Ti * C\%) / Tn * \text{current\_actual\_BW} \quad (3)$$

In an embodiment, CPU limiting program 112 then calculates the new network bandwidth allocation using formula (4).

$$\text{new\_setting\_BW} = \text{current\_BW} - \text{over\_committed\_BW} * A\% \quad (4)$$

In an embodiment, the new expected network CPU usage (Tn) is Ti*C %.

In an embodiment, if Tn<Ti*C %, and the current actual bandwidth usage is less than or equal to the current bandwidth setting, then additional network bandwidth can be allocated to the container process. CPU limiting program 112 calculates the additional amount of network bandwidth that may be allocated using formula (5).

$$\text{additional\_BW} = (Ti * C\% - Tn) / Tn * \text{current\_real\_BW} \quad (5)$$

In an embodiment, CPU limiting program 112 then calculates the new network bandwidth allocation using formula (6).

$$\text{new\_setting\_BW} = \text{current\_BW} + \text{additional\_BW} * A\% \quad (6)$$

In an embodiment, CPU limiting program 112 uses the metering parameter A % in both formula (4) and formula (6) because it is not desirable to have the change in bandwidth exceed a predetermined amount in any one step. Since this process repeats continuously, the bandwidth will slowly be adjusted until it meets the predetermined CPU quota. In an embodiment, the new expected network CPU usage (Tn) is Tn+(Ti*C %−Tn)*A %.

In an embodiment, if CPU limiting program 112 determines that the total CPU usage for the overall container process (Td) exceeds the predetermined threshold, and the actual Tn is less than or equal to the expected Tn, then the network bandwidth is acceptable, and the CPU allocation must be adjusted rather than the network bandwidth. In an embodiment, if the CPU usage of the container process Tu>Ti−expected_Tn, then Tu is over committed. In an embodiment, CPU limiting program 112 calculates the amount of the over commitment using formula (7).

$$\text{overcommit\_Tu} = Tu - (Ti - \text{expected\_Tn}) \quad (7)$$

In an embodiment, CPU limiting program 112 calculates the new setting for the container process CPU usage using formula (8).

$$\text{new\_setting\_CPU} = Tu - \text{overcommit\_Tu} * A\% \quad (8)$$

In an embodiment, if the CPU usage of the container process Tu<Ti−expected_Tn and Tu is less than or equal to the current CPU usage setting, then Tu is under committed, and additional CPU usage can be allocated to the container process. In an embodiment, CPU limiting program 112 calculates the amount of additional CPU usage that can be allocated to the container process using formula (9).

$$\text{addition\_CPU} = (Ti - \text{expected\_Tn}) - Tu \quad (9)$$

In an embodiment, CPU limiting program 112 calculates the new setting for the container process CPU usage using formula (10).

$$\text{new\_setting\_CPU} = Tu + \text{addition\_CPU} * A\% \quad (10)$$

In an embodiment, CPU limiting program 112 then returns to step 606 to continue monitoring the CPU usage.

Figure 7:
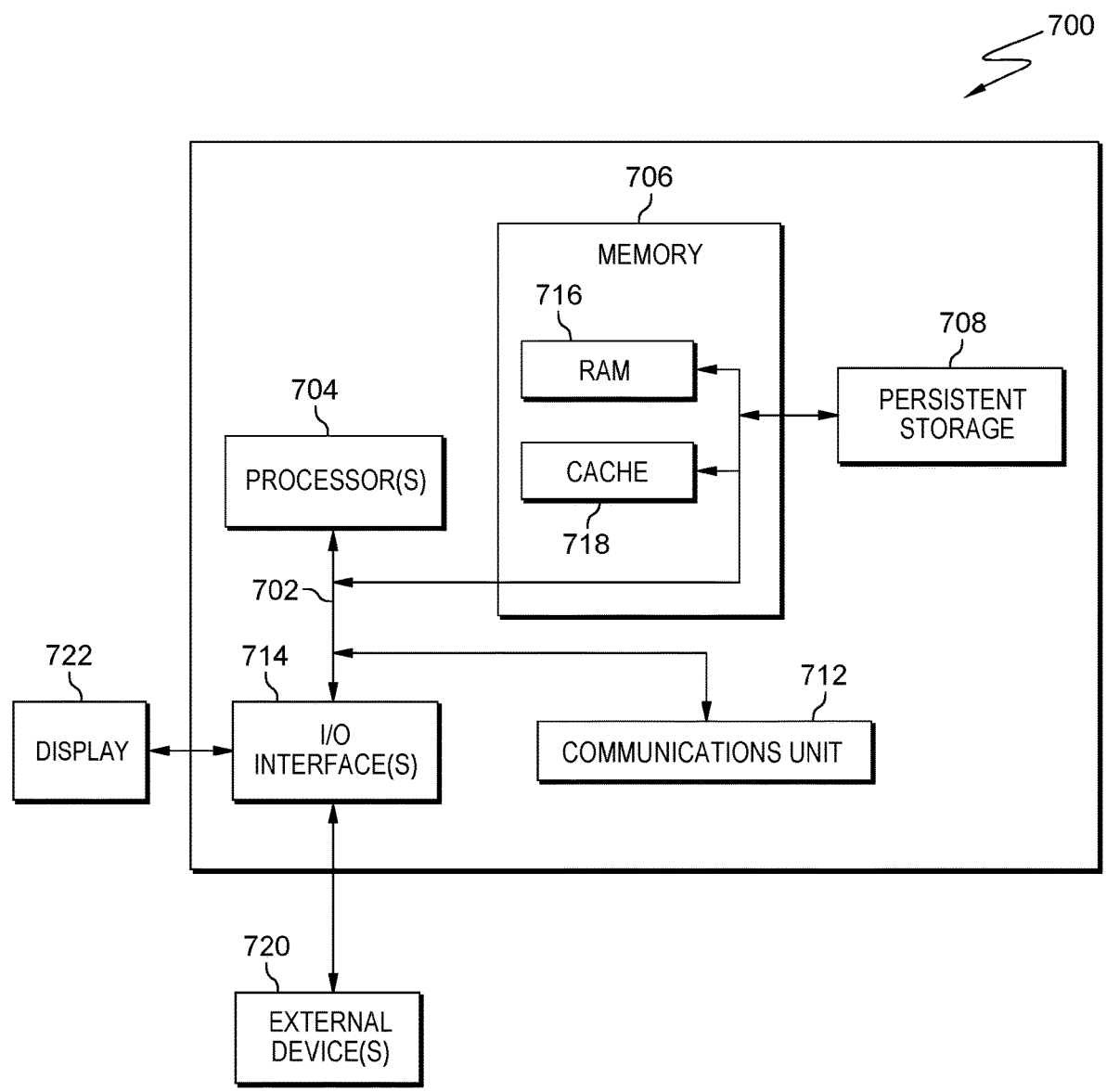
FIG. 7 depicts a block diagram of components of the computing devices executing the CPU limiting program within the distributed data processing environment of FIG. 1, in accordance with an embodiment of the present invention.

FIG. 7 is a block diagram depicting components of computing device 110 suitable for CPU limiting program 112, in accordance with at least one embodiment of the invention. FIG. 7 displays computer 700; one or more processor(s) 704 (including one or more computer processors); communications fabric 702; memory 706, including random-access memory (RAM) 716 and cache 718; persistent storage 708; communications unit 712; I/O interfaces 714; display 722; and external devices 720. It should be appreciated that FIG. 7 provides only an illustration of one embodiment and does not imply any limitations with regard to the environments in which different embodiments may be implemented. Many modifications to the depicted environment may be made.

As depicted, computer 700 operates over communications fabric 702, which provides communications between computer processor(s) 704, memory 706, persistent storage 708, communications unit 712, and I/O interface(s) 714. Communications fabric 702 may be implemented with any architecture suitable for passing data or control information between processors 704 (e.g., microprocessors, communications processors, and network processors), memory 706, external devices 720, and any other hardware components within a system. For example, communications fabric 702 may be implemented with one or more buses.

Memory 706 and persistent storage 708 are computer readable storage media. In the depicted embodiment, memory 706 comprises RAM 716 and cache 718. In general, memory 706 can include any suitable volatile or non-volatile computer readable storage media. Cache 718 is a fast memory that enhances the performance of processor(s) 704 by holding recently accessed data, and near recently accessed data, from RAM 716.

Program instructions for CPU limiting program 112 may be stored in persistent storage 708, or more generally, any computer readable storage media, for execution by one or more of the respective computer processors 704 via one or more memories of memory 706. Persistent storage 708 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links. In the context of some embodiments of the present invention, the source of the various input data may be physically remote to computer 700 such that the input data may be received, and the output similarly transmitted via communications unit 712.

I/O interface(s) 714 allows for input and output of data with other devices that may be connected to computer 700. For example, I/O interface(s) 714 may provide a connection to external device(s) 720 such as a keyboard, a keypad, a touch screen, a microphone, a digital camera, and/or some other suitable input device. External device(s) 720 can also include portable computer readable storage media such as, for example, thumb drives, portable optical or magnetic disks, and memory cards. Software and data used to practice embodiments of the present invention, e.g., CPU limiting program 112, can be stored on such portable computer readable storage media and can be loaded onto persistent storage 708 via I/O interface(s) 714. I/O interface(s) 714 also connect to display 722.

Display 722 provides a mechanism to display data to a user and may be, for example, a computer monitor. Display 722 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for computer resource allocation, the computer-implemented method comprising:
    determining, by one or more computer processors, a packet CPU usage for each packet type of one or more packet types;
    calculating, by the one or more computer processors, a network CPU usage for a specific container based on the network CPU usage for each packet type of the one or more packet types;
    calculating, by the one or more computer processors, a container process CPU usage and a total container CPU usage for the specific container, wherein the total container CPU usage is a sum of the network CPU usage and the container process CPU usage; and
    responsive to determining that the total container CPU usage exceeds a threshold, adjusting, by the one or more computer processors, a container CPU consumption quota and a container network bandwidth setting for the specific container to reduce the total container CPU usage, wherein the container CPU consumption quota and the container network bandwidth setting are adjusted using a set of pre-configured parameters.

2. The computer-implemented method of claim 1, wherein determining a packet CPU usage for each packet type of the one or more packet types further comprises:
    calculating, by the one or more computer processors, a network interrupt CPU time, wherein the network interrupt CPU time is a time required to service a network interrupt;
    counting, by the one or more computer processors, an overall total number of packets for each packet type of the one or more packet types;
    assigning, by the one or more computer processors, a weight factor to each packet type of the one or more packet types; and
    counting, by the one or more computer processors, a total number of packets for each packet type of the one or more packet types in the specific container.

3. The computer-implemented method of claim 2, wherein calculating the network CPU usage for the specific container based on the network CPU usage for each packet type of the one or more packet types further comprises:
    calculating, by the one or more computer processors, a total network CPU usage, wherein the total network CPU usage is the sum of the packet CPU usage for each packet type of the one or more packet types;
    calculating, by the one or more computer processors, a container network CPU usage, wherein the container network CPU usage is the sum of the packet CPU usage for each packet type of the one or more packet types for all packets in the specific container;
    dividing, by the one or more computer processors, the container network CPU usage by the total network CPU usage to determine a container network CPU usage percentage; and
    calculating, by the one or more computer processors, the network CPU usage for the specific container by multiplying the container network CPU usage percentage by a time interval.

4. The computer-implemented method of claim 1, wherein responsive to determining that the total container CPU usage exceeds the threshold, adjusting the container CPU consumption quota and the container network bandwidth setting for the specific container to reduce the total container CPU usage, wherein the container CPU consumption quota and the container network bandwidth setting are adjusted using the set of pre-configured parameters further comprises:
    reducing, by the one or more computer processors, the container CPU consumption quota based on a first pre-configured parameter of the set of pre-configured parameters;
    reducing, by the one or more computer processors, the container network bandwidth setting based on a second pre-configured parameter of the set of pre-configured parameters;
    calculating, by the one or more computer processors, a new expected network CPU usage; and adjusting the container CPU consumption quota and the container network bandwidth setting for the specific container based on the new expected network CPU usage.

5. The computer-implemented method of claim 1, wherein the set of pre-configured parameters further comprises at least one of an adjustment percentage, a threshold percentage, a maximum proportion of the network CPU usage in an initial configuration CPU usage quota, and a period time for sampling.

6. The computer-implemented method of claim 1, wherein the network CPU usage for the specific container, the container process CPU usage, and the total container CPU usage for the specific container are calculated over a pre-configured time interval.

7. The computer-implemented method of claim 6, wherein the container CPU consumption quota and the container network bandwidth setting for the specific container are adjusted over the pre-configured time interval.

8. A computer program product for computer resource allocation, the computer program product comprising one or more computer readable storage media and program instructions stored on the one or more computer readable storage media, the program instructions including instructions to:
 determine a packet CPU usage for each packet type of one or more packet types;
 calculate a network CPU usage for a specific container based on the network CPU usage for each packet type of the one or more packet types;
 calculate a container process CPU usage and a total container CPU usage for the specific container, wherein the total container CPU usage is a sum of the network CPU usage and the container process CPU usage; and
 responsive to determining that the total container CPU usage exceeds a threshold, adjust a container CPU consumption quota and a container network bandwidth setting for the specific container to reduce the total container CPU usage, wherein the container CPU consumption quota and the container network bandwidth setting are adjusted using a set of pre-configured parameters.

9. The computer program product of claim 8, wherein determine a packet CPU usage for each packet type of one or more packet types further comprises one or more of the following program instructions, stored on the one or more computer readable storage media, to:
 calculate a network interrupt CPU time, wherein the network interrupt CPU time is a time required to service a network interrupt;
 count an overall total number of packets for each packet type of the one or more packet types;
 assign a weight factor to each packet type of the one or more packet types; and
 count a total number of packets for each packet type of the one or more packet types in the specific container.

10. The computer program product of claim 9, wherein calculate a network CPU usage for a specific container based on the network CPU usage for each packet type of the one or more packet types further comprises one or more of the following program instructions, stored on the one or more computer readable storage media, to:
 calculate a total network CPU usage, wherein the total network CPU usage is the sum of the packet CPU usage for each packet type of the one or more packet types;
 calculate a container network CPU usage, wherein the container network CPU usage is the sum of the packet CPU usage for each packet type of the one or more packet types for all packets in the specific container;
 divide the container network CPU usage by the total network CPU usage to determine a container network CPU usage percentage; and
 calculate the network CPU usage for the specific container by multiplying the container network CPU usage percentage by a time interval.

11. The computer program product of claim 8, wherein responsive to determining that the total container CPU usage exceeds the threshold, adjusting the container CPU consumption quota and the container network bandwidth setting for the specific container to reduce the total container CPU usage, wherein the container CPU consumption quota and the container network bandwidth setting are adjusted using the set of pre-configured parameters further comprises one or more of the following program instructions, stored on the one or more computer readable storage media, to:
 reduce the container CPU consumption quota based on a first pre-configured parameter of the set of pre-configured parameters;
 reduce the container network bandwidth setting based on a second pre-configured parameter of the set of pre-configured parameters;
 calculate a new expected network CPU usage; and
 adjust the container CPU consumption quota and the container network bandwidth setting for the specific container based on the new expected network CPU usage.

12. The computer program product of claim 8, wherein the set of pre-configured parameters further comprises at least one of an adjustment percentage, a threshold percentage, a maximum proportion of the network CPU usage in an initial configuration CPU usage quota, and a period time for sampling.

13. The computer program product of claim 8, wherein the network CPU usage for the specific container, the container process CPU usage, and the total container CPU usage for the specific container are calculated over a pre-configured time interval.

14. The computer program product of claim 13, wherein the container CPU consumption quota and the container network bandwidth setting for the specific container are adjusted over the pre-configured time interval.

15. A computer system for computer resource allocation, the computer system comprising:
 one or more computer processors;
 one or more computer readable storage media; and
 program instructions stored on the one or more computer readable storage media for execution by at least one of the one or more computer processors, the stored program instructions including instructions to:
 determine a packet CPU usage for each packet type of one or more packet types;
 calculate a network CPU usage for a specific container based on the network CPU usage for each packet type of the one or more packet types;
 calculate a container process CPU usage and a total container CPU usage for the specific container, wherein the total container CPU usage is a sum of the network CPU usage and the container process CPU usage; and
 responsive to determining that the total container CPU usage exceeds a threshold, adjust a container CPU consumption quota and a container network bandwidth setting for the specific container to reduce the total container CPU usage, wherein the container CPU consumption quota and the container network bandwidth setting are adjusted using a set of pre-configured parameters.

16. The computer system of claim 15, wherein determine a packet CPU usage for each packet type of one or more packet types further comprises one or more of the following program instructions, stored on the one or more computer readable storage media, to:
calculate a network interrupt CPU time, wherein the network interrupt CPU time is a time required to service a network interrupt;
count an overall total number of packets for each packet type of the one or more packet types;
assign a weight factor to each packet type of the one or more packet types; and
count a total number of packets for each packet type of the one or more packet types in the specific container.

17. The computer system of claim 16, wherein calculate a network CPU usage for a specific container based on the network CPU usage for each packet type of the one or more packet types further comprises one or more of the following program instructions, stored on the one or more computer readable storage media, to:
calculate a total network CPU usage, wherein the total network CPU usage is the sum of the packet CPU usage for each packet type of the one or more packet types;
calculate a container network CPU usage, wherein the container network CPU usage is the sum of the packet CPU usage for each packet type of the one or more packet types for all packets in the specific container;
divide the container network CPU usage by the total network CPU usage to determine a container network CPU usage percentage; and
calculate the network CPU usage for the specific container by multiplying the container network CPU usage percentage by a time interval.

18. The computer system of claim 15, wherein responsive to determining that the total container CPU usage exceeds the threshold, adjusting the container CPU consumption quota and the container network bandwidth setting for the specific container to reduce the total container CPU usage, wherein the container CPU consumption quota and the container network bandwidth setting are adjusted using the set of pre-configured parameters further comprises one or more of the following program instructions, stored on the one or more computer readable storage media, to:
reduce the container CPU consumption quota based on a first pre-configured parameter of the set of pre-configured parameters;
reduce the container network bandwidth setting based on a second pre-configured parameter of the set of pre-configured parameters;
calculate a new expected network CPU usage; and
adjust the container CPU consumption quota and the container network bandwidth setting for the specific container based on the new expected network CPU usage.

19. The computer system of claim 15, wherein the set of pre-configured parameters further comprises at least one of an adjustment percentage, a threshold percentage, a maximum proportion of the network CPU usage in an initial configuration CPU usage quota, and a period time for sampling.

20. The computer system of claim 15, wherein the network CPU usage for the specific container, the container process CPU usage, and the total container CPU usage for the specific container are calculated over a pre-configured time interval.

* * * * *